United States Patent [19]

Kato

[11] Patent Number: 5,016,485
[45] Date of Patent: May 21, 1991

[54] LEVER APPARATUS

[75] Inventor: Hiroyuki Kato, Aichi, Japan

[73] Assignee: Kabushiki Kaisha Toka-Rika-Denki-Seisakusho, Aichi, Japan

[21] Appl. No.: 512,584

[22] Filed: Apr. 23, 1990

Related U.S. Application Data

[63] Continuation of Ser. No. 292,421, Dec. 30, 1988, abandoned.

[30] Foreign Application Priority Data

Jan. 12, 1988 [JP] Japan .................. 63-2298[U]

[51] Int. Cl.$^5$ .............................................. F16J 15/50
[52] U.S. Cl. ................................................ 74/18.1
[58] Field of Search .................... 74/18.1, 566, 473

[56] References Cited

U.S. PATENT DOCUMENTS

| | | | |
|---|---|---|---|
| 3,487,245 | 12/1969 | Pontis | 74/18.1 |
| 4,229,010 | 10/1980 | St. Laurent | 74/18.1 |
| 4,598,606 | 7/1986 | Foggim | 74/566 |
| 4,718,680 | 1/1988 | Halconruy et al. | 74/18.1 |
| 4,793,620 | 12/1988 | Karch | 74/566 |

Primary Examiner—Joseph Falk
Attorney, Agent, or Firm—Sixbey, Friedman, Leedom & Ferguson

[57] ABSTRACT

A lever apparatus includes a lever that extends outwardly from the interior of a body through an opening formed in the body. The lever is pivotally supported on the body, and an elastic boot that covers the portion of the lever which is located near the opening. The boot is provided on the body in such a manner as to be pivotal in response to the pivoting of the lever. This makes the boot pivoted together with the lever.

21 Claims, 4 Drawing Sheets

LEVER APPARATUS

This application is a continuation of Ser. No. 07/292,421, filed Dec. 30, 1988, now abandoned.

BACKGROUND OF THE INVENTION

1. Field of the Invention

The present invention relates to a lever apparatus having a lever pivotally provided on a body and extended through a lever hole formed in the body to be retained in a predetermined pivoted position.

2. Description of the Related Art

Suitable lever apparatus of the above-described type include a lever combination switch device for a vehicle. This lever combination switch device has, for example a lever for, a turn signal switch which is pivotally mounted on a body mounted on the upper end portion of a steering pipe to extend through a lever hole formed in the body. The lever is also arranged in such a manner that it can be retained at one of predetermined positions, e.g., positions of "right turn", "neutral" and "left turn". In this type of lever apparatus, the lever hole is shaped in a rectangular form so as to cope with the pivotal movement of the lever. This shape allows the interior of the body of the lever apparatus to be undesirably seen through the hole. Accordingly, a bellows-like boot made of rubber is fixedly mounted in such a manner as to cover the portion of the lever which is located near the lever hole.

However, since the boot that covers the portion of the lever in this conventional lever apparatus is located near the lever port that is fixed to the body, when the lever is pivoted through a large angle, the boot is deformed to such a degree that the elasticity thereof cannot absorb the deformation. This causes the possibility of the boot buckling, and thus deteriorates the appearance of the boot.

SUMMARY OF THE INVENTION

Accordingly, an object of the present invention is to provide a lever apparatus which is capable of preventing any possibility of a boot that covers the portion of a lever located near a lever port from buckling when the lever is pivoted, so as to prevent deterioration of the appearance of the boot.

To this end, the present invention provides a lever apparatus which comprises a lever pivotally mounted on a body by being passed through a lever hole formed in the body, the lever being retained at predetermined positions, and a boot made of an elastic material The boot covers the portion of the lever located near the lever hole The boot is mounted on the body in such a manner as to be pivotal to the direction in which the lever is pivoted, so that it can be pivoted following the pivotal movement of the lever.

In the present invention, a boot made of an elastic material which covers the portion of the lever located near the lever hole is provided on the body in such a manner as to be pivotal in the direction to which the lever is pivoted. In consequence, the boot pivots following the pivotal movement of the lever, even when the angle through which the lever is pivoted is large. This allows the degree of deformation of the boot caused by the pivoting of the lever to be reduced and, hence, prevents any possibility of the boot buckling.

DESCRIPTION OF THE PREFERRED EMBODIMENTS

A first embodiment of the present invention in which the present invention is applied to a lever combination switch device for a vehicle will be described below with reference to the accompanying drawings.

Figure 1:
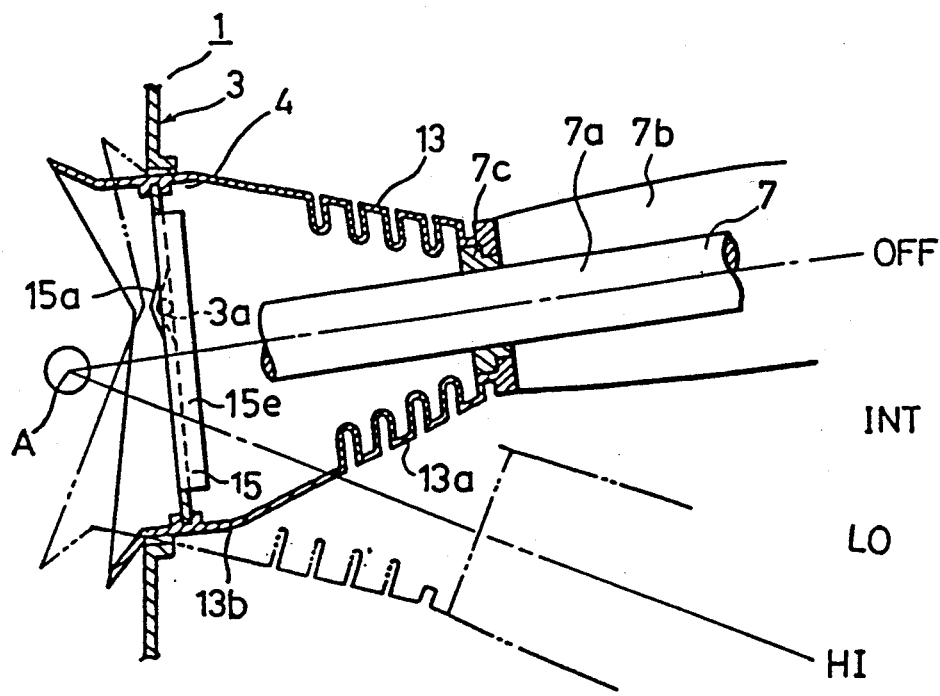
FIG. 1 is a sectional view of a wiper switch lever portion of a lever apparatus of the present invention.
Figure 2:
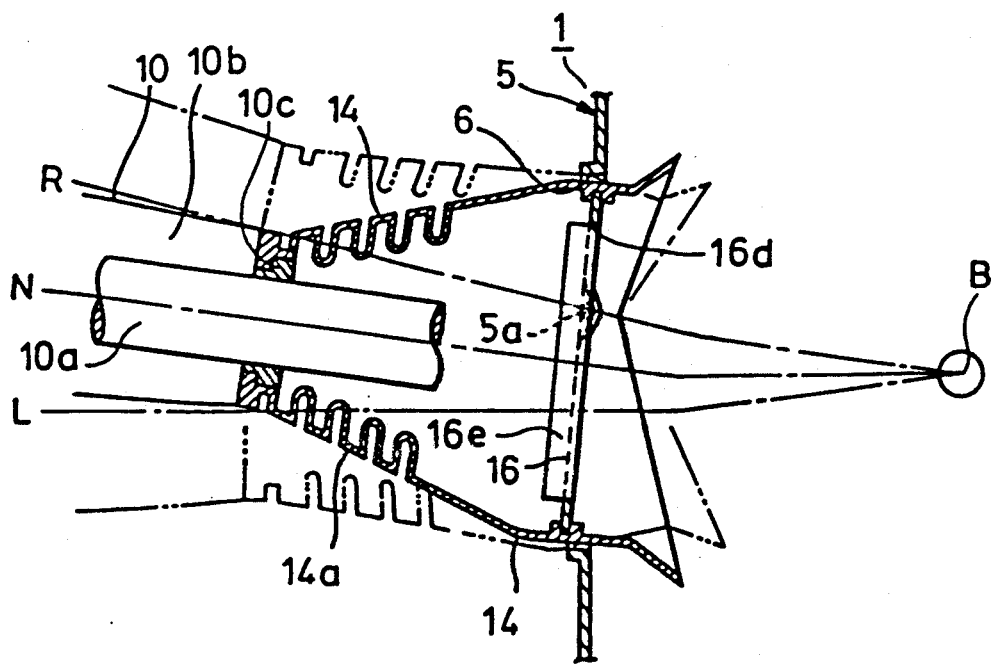
FIG. 2 is a sectional view of a turn signal switch lever portion.
Figure 3:
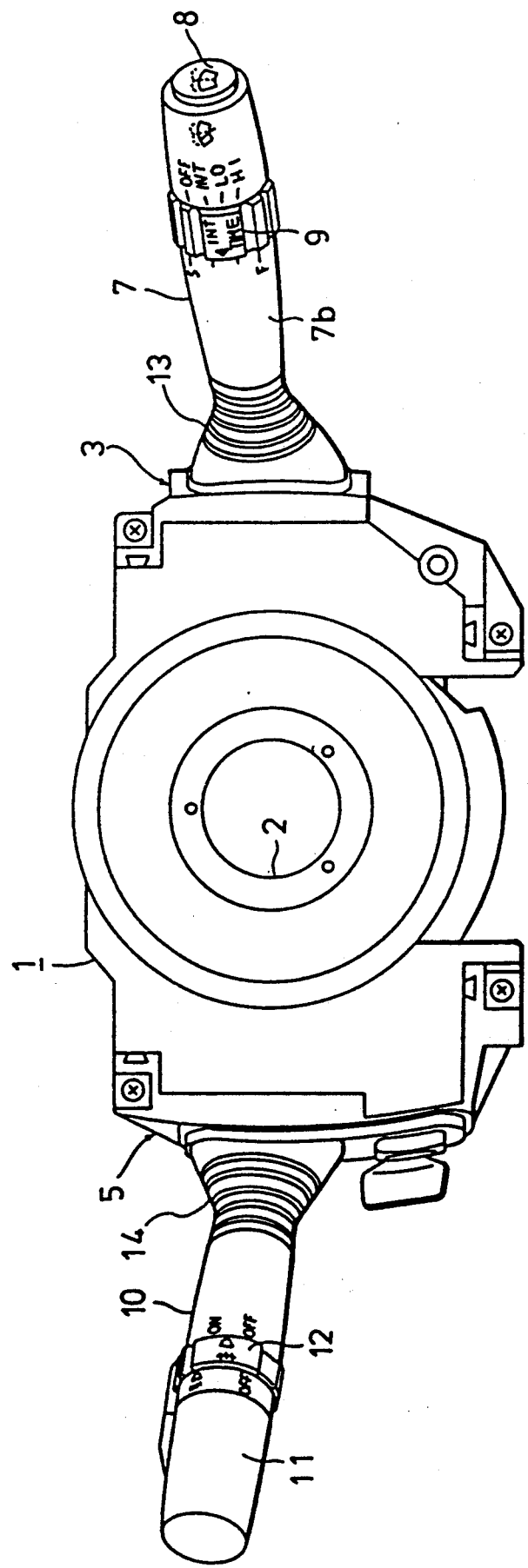
FIG. 3 is a front view of the lever apparatus.

Referring first to FIG. 3, a body 1 is mounted on the upper end portion of a steering pipe (not shown). The body 1 has a cylindrical portion 2 at the central portion thereof, through which a steering shaft (not shown) is passed. A right boot mounting member 3 is mounted on the right end portion of the body 1 as viewed in FIG. 3. The right boot mounting member 3 has a substantially rectangular lever hole 4 through which a lever is passed. Also, a left boot mounting member 5 is mounted on the left end portion of the body 1 as viewed in FIG. 1, and the left boot mounting member 5, like the right boot mounting member 3, has a substantially rectangular lever hole 6 (see FIG. 2). A wiper switch lever 7 which serves as a lever has a metal shaft 7a, and an operating portion 7b made of a resin which is fixed on the side of the outer periphery of the shaft 7a which faces a seat occupant, as shown in FIG. 1. The lever 7 is mounted on the body through the right lever hole 4 in such a manner as to be pivotal about a center A serving as a fulcrum. The lever can be retained in four respective positions including "OFF", "INT", "LO" and "HI". The operating portion 7b of the wiper switch lever 7 is provided with a washer switch operator 8 and an operator 9 for setting the time interval of "INT". A turn signal switch lever 10 which serves as a lever has a metal shaft 10a, and an operating portion 10b made of a resin which is fixed on the side of the outer periphery of the shaft 10a which faces the seat occupant, as shown in FIG. 2. The lever 10 is mounted on the body 1 in such a manner as to be pivotal about a center B acting as a fulcrum in the state wherein it is passed through the left lever hole 6. The lever 10 can be retained in three respective positions, e.g., "R (right turn)", "N (neutral position)" and "L (left turn)". The operating portion 10b of this turn signal switch lever 10 is provided with a light switch operating member 11 and a fog light switch operating member 12.

The portions Of the wiper switch lever 7 and turn signal switch lever 10 which are located near the lever holes 4 and 6 are respectively covered by boots 13 and 14. As shown in FIG. 5, the boot 13 or 14 has a bellowed-shaped cylindrical portion 13a or 14a which is made of an elastic material such as rubber and which has a tapered form in cross-sectional view, and an angular tubular portion 13b or 14b which is formed integrally with the bellowed-shaped cylindrical portion 13a or 14a. A substantially rectangular boot frame 15 or 16 (see FIG. 6) made of, for example, a steel plate is fitted in the groove formed over the entirety of an inner wall of the angular cylindrical portion 13b or 14b. The outer edge portion of the boot frame 15 or 16 has substantially the same form as that of the lever hole 4 or 6 but is slightly smaller in size than that of the lever hole 4 or 6. The boot frame 15 or 16 has a rectangular opening 15d or 16d through which electrical wiring located within the lever 7 or 10 and the shaft 7a or 10a are passed. The edge portions of the two sides that run parallel to the plane in which the lever 7 or 10 is pivoted are bent outwardly to form bending portions 15e or 16e. In this way, possibility of damage to the electrical wiring is avoided. The mounting of the boots 13 and 14 on the boot mounting members 3 and 5 will be described in detail. Since the boots 13 and 14 are mounted in substantially the same manner, only the mounting of the boot 13 wi)l be described below with reference to FIGS. 4 to 8.

Figure 4:
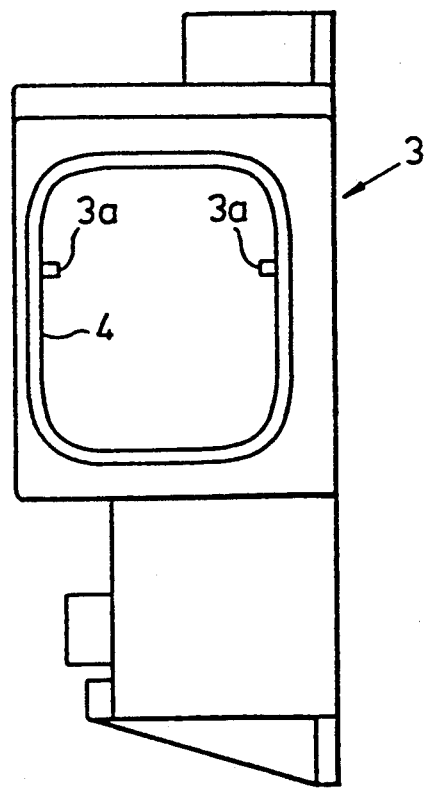
FIG. 4 is a front view of a boot mounting member.
Figure 5:
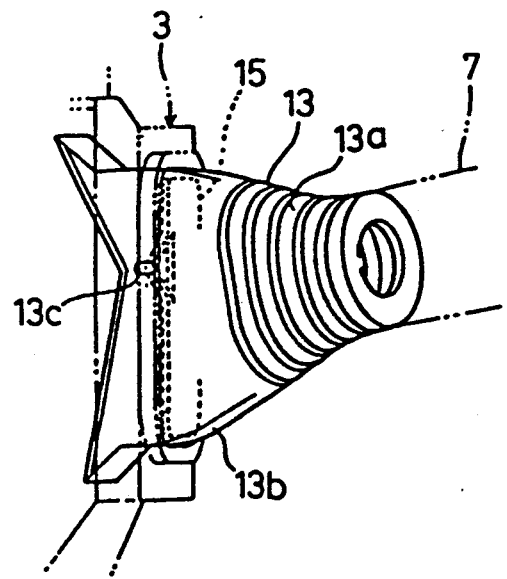
FIG. 5 is a perspective view of a boot.
Figure 6:
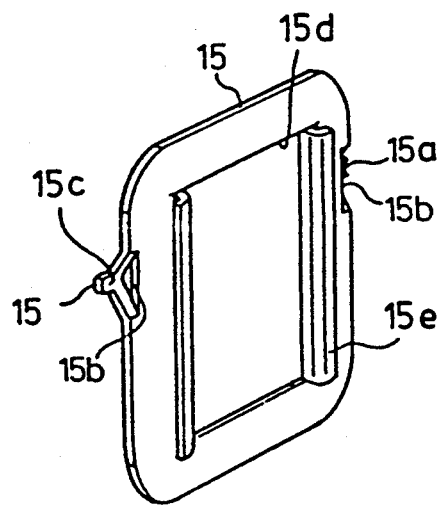
FIG. 6 is a perspective view of a boot frame of a first embodiment.
Figure 8:
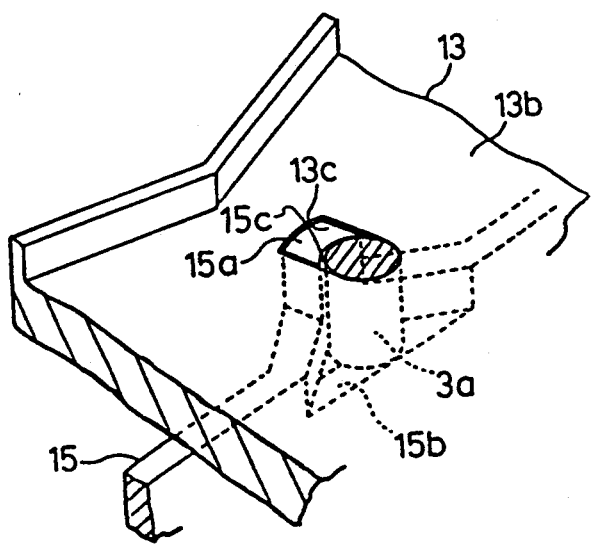
FIG. 8 is a perspective view of the essential parts of the lever apparatus.
Figure 7:
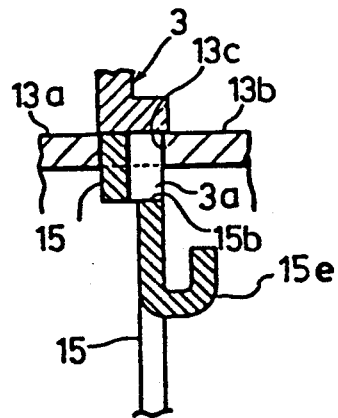
FIG. 7 is a sectional view of the essential parts of the lever apparatus.

As shown in FIG. 4, the right and left sides of the boot mounting member 3 as viewed in FIG. 4 are provided with shaft portions 3a serving as centers around which the boot is pivoted. The shaft portions 3a are located at positions which are, for example, separated a small distance from the central portions of the right and left sides in the upper direction. Further, each of the side wall portions of the angular cylindrical portion 13b of the boot 13 is provided with an elongated hole portion 13c (only one of the hole portions being shown in FIG. 5) at a position where the hole faces the corresponding shaft portion 3a, as shown in FIG. 5. Furthermore, each of the right and left side portions of the boot frame 15 has a shaft supporting portion 15a that protrudes and a shaft receiving end face portion 15b formed by pressing positions that face the corresponding hole 13c, as shown in FIG. 6. In a state wherein the shaft supporting portions 15a are fitted in the corresponding hole portions 13c formed in the boot 13, the shaft portions 3a of the boot mounting member 3 are inserted into the hole portions 13c next to the shaft supporting portions 15a in such a manner that the forward end portions of the shaft portions 3a are received by the shaft receiving end face portions 15b of the boot frame 15, as shown in FIGS. 7 and 8. The surface 15c of each of the shaft supporting portions 15a which is caused to slide along the shaft portion 3a is curved so that it fits the peripheral surface of the shaft portion 3a. This makes pivoting of the boot frame 15 smooth. The forward opening of the bellows-shaped cylindrical portion 13a of the boot 13 is fixed on a ring 7c made of resin which is fixed to the shaft 7a adjacent to the operating portion 7b in a state wherein the shaft 7a of the wiper switch lever 7 is passed therethrough, as shown in FIG. 1. In this way, the boot 13 is provided in such a manner as to be pivotal about the shaft portions 3a relative to the boot mounting member 3, that is, to the body I, and this causes the boot 13 to pivot in the direction in which the wiper switch lever 7 is pivoted. As shown in FIG. 2, the left boot mounting member 5 has shaft portions 5a. The right boot mounting member 3 also has shaft portions 3a. Shaft portions 5a have the same structure as that of shaft portions 3a and function in the same manner as shaft portions 3a do. In addition, a ring 10c which has the same structure and function of the ring 7c shown in FIG. 1 is fixed to shaft 10a.

The operation of the thus-arranged lever apparatus is described below.

In FIG. 1, which shows the wiper switch lever 7 side of the lever apparatus, is a case where the wiper switch lever 7 is pivoted through a large angle from "OFF" to "HI". In this case the boot 13 follows the pivoting of the wiper switch lever 7 and pivots about the shaft portions 3a. Thus, when lever 7 is pivoted to "HI" position, boot 13 is rendered to a state shown by the two-dot chain line in FIG. 1. In consequence, the amount of deformation of the boot 13 can be reduced as compared with a conventional lever apparatus. This prevents any possibility of buckling occurring in boot 13, and improves the appearance of the boot 13.

In FIG. 2, which shows the side of the turn signal switch lever 10, when the turn signal switch lever 10 is pivoted from "N" to "R" or from "N" to "L", the boot 14 follows the pivotal movement of the turn signal switch lever 10 and thereby pivots about the shaft portions 5a of the boot mounting member 5. In that case, the angle through which the boot 14 pivoted, in accordance with the pivotal movement of the lever 10, is small because the center B of the pivoting of lever 10 is distant from the boot 14. Thus, with lever 10 located at "R" or "L", boot 14 is rendered to a state shown by the two-dot chain line in FIG. 2. In consequence, the amount of deformation of the boot 14 can be reduced as compared with the conventional lever apparatus, and this prevents any possibility of buckling occurring in boot 14 and improves the appearance of the boot 14.

In the above-described embodiment, the present invention is applied to a lever combination switch device for a vehicle. However, the present invention is not limited to this and can be applied to a shift lever device, a parking brake lever device or a seat reclining lever device for an automobile or the like.

Further, in this embodiment, the shaft portions 3a and 5a about which the boots 13 and 14 are pivoted are located at positions which deviate from the lines which pass through the axial centers of the levers 7 and 10. However, these shaft portions 3a and 5a may also be positioned such that the axial lines thereof intersect the lines which pass through the axial centers of the levers 7 and 10 when the levers 7 or 10 are located at the OFF position or the Neutral (N) position.

Figure 9:
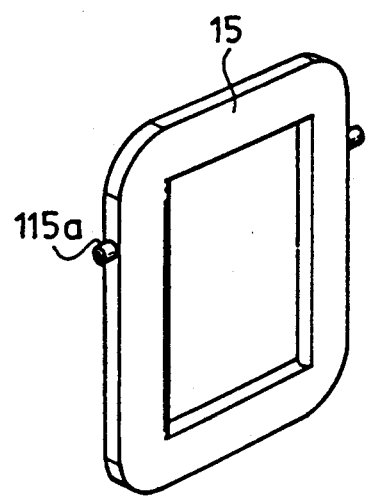
FIG. 9 is a perspective view of another example of a boot frame.

Furthermore, the aforementioned embodiment employs the boot frame 15 made of metal. However, a boot frame 15 made of resin may also be employed. In that case, cylindrical shaft portions 115a into which the shaft portions 3a are pivotally fitted may be formed on the boot frame 15 in place of the shaft supporting portions 15a and the shaft receiving end face portions 15b, as shown in FIG. 9. In that case, preferably, the thickness of boot frame 15 is wide. The bending portions 15e may not be provided.

What is claimed is:
1. A lever apparatus, comprising:
a body having an opening and a pivot support apparatus provided in the interior thereof;
a lever extending outwardly from the interior of said body through said opening in said body, said lever being pivotally supported by said pivot support apparatus in said interior of said body;
an elastic covering member having a first end and a second end, and a substantially tapered shape, said second end having a larger diameter than said first end, said covering member protruding from an inner boundary of said opening through and out of said opening so as to substantially cover said opening of said body, said first end being supported at the circumferential periphery of an intermediate portion of said lever, said lever extending outward through said opening into and through said covering member, and protruding through said first end of said covering member; and pivotally supporting means for supporting said second end of said covering member and allowing said second end to pivot with respect to said body in conjunction with the pivoting of said lever.

2. A lever apparatus according to claim 1, wherein said covering member comprises a cylindrical portion which extends outwardly from said interior of said body through said opening, and the first end of said cylindrical portion is secured at the circumferential periphery of said lever, and the second end of said covering member is in contact with said opening and has an enlarged diameter portion larger than that of said first end, and said enlarged diameter portion substantially covers said opening.

3. A lever apparatus according to claim 2, wherein said cylindrical portion is made elastic by the provision of bellows between said outer end portion and said enlarged diameter portion.

4. A lever apparatus according to claim 3, wherein said cylindrical portion is of a tapered form with the diameter of said cylindrical portion which is gradually increased from said outer first end portion to said enlarged diameter portion.

5. A lever apparatus according to claim 2, further including a frame provided at the inner periphery of said second end of said elastic covering member to maintain the shape of said enlarged diameter portion and said frame being pivotally supported so as to enable said elastic covering member to pivot with respect to said body.

6. A lever apparatus according to claim 5, wherein the outer edge portion of said frame has substantially the same form as that of said opening and is slightly smaller in size than that of said opening.

7. A lever apparatus according to claim 1, wherein said pivotally supporting means include a pair of protrusions that extend inward from an inner peripheral portion of said opening of said body substantially perpendicular to the plane in which said lever is pivoted, and a pair of receptacles are formed in an outer peripheral portion of said second end of said elastic covering member for accommodating said protrusion of said body.

8. A lever apparatus according to claim 7, wherein said protrusions are columnar, said receptacles are elongated, and said pivotally supporting means includes protruding pieces which protrude from opposite sides of the outer peripheral edge portion of said frame and are inserted in said elongated receptacles and each of said protruding pieces has a contacting surface which acts as a baring with respect to the peripheral surface of said columnar protrusions during the pivoting of said covering member.

9. A lever apparatus according to claim 8, wherein said contacting surfaces are curved so as to fit the peripheral surface of said protrusions.

10. A lever apparatus according to claim 5, wherein said pivotally supporting means includes a pair of protrusions that extend inward from the inner peripheral portion of said opening or of said body in a direction substantially perpendicular to the plane in which said lever is pivoted, elongated receptacles are formed in said cover member to receive respectively said protrusions, said frame has projected portions at both sides which are respectively received in said elongated receptacles together with said protrusions of said pivotally supporting means, and said receptacles accommodate rotatably said protrusions.

11. A lever apparatus, comprising:
a body having an opening and pivot support apparatus provided in the interior thereof;
a lever extending outwardly from the interior of said body through said opening of said body, said lever being pivotally supported by said pivotal support apparatus in said interior of said body and being retainable at predetermined pivoted positions;
an elastic, cylindrical boot having a first end and a second end provided with a larger diameter than said first end and a substantially tapered shape, said boot protruding from an inner circumference of said opening through and out of said opening, and said first end of said boot being supported on the outer periphery of an intermediate portion of said lever, said second end of said boot being closer to said opening and forming an enlarged diameter portion having a diameter large enough to substantially cover said opening; and
pivotally supporting means for supporting said enlarged diameter portion of said boot and allowing said enlarged diameter portion of said boot to pivot with respect to said body in conjunction with the pivoting of said lever.

12. A lever apparatus according to claim 11, wherein said boot is made elastic by the provision of a bellow-like portion between said outer end portion and said enlarged diameter portion.

13. A lever apparatus according to claim 12, wherein said boot is substantially of a tapered form with the diameter of said boot gradually increased from said outer end portion to said enlarged diameter portion.

14. A lever apparatus according to claim 11, further including a boot frame provided inside of said enlarged diameter portion so as to maintain the shape of said enlarged diameter portion and to pivot against said body with said enlarged diameter portion.

15. A lever apparatus according to claim 14, wherein the outer edge portion of said boot frame has substantially the same form as that of said opening and is slightly smaller in size than that of said opening.

16. A lever apparatus according to claim 14, wherein said pivotally supporting means includes a pair of cylindrical shaft portions that extend from said opening of said body in a direction substantially perpendicular to the plane in which said lever is pivoted, and a pair of elongated receptacles formed in said enlarged diameter portion of said boot for accommodating said shaft portions in such a manner that said shaft portions are rotatable relative to said elongated receptacles.

17. A lever apparatus according to claim 16, wherein said supporting means further includes protruding pieces protruding from the outer peripheral edge portion of said boot frame, said protruding pieces being inserted in said elongated receptacles, each of said protruding pieces having a contacting surface which exerts a bearing effect against the peripheral surface of said shaft portions during the pivoting of said boot.

18. A lever apparatus according to claim 17, wherein said contacting surfaces are curved so as to fit the peripheral surface of said shaft portion.

19. A lever apparatus according to claim 14, wherein said pivotally supporting means includes a pair of cylindrical shaft portions that extend from the edge portion of said opening substantially perpendicular to the plane in which said lever is pivoted, and cylindrical portions protruding from the outer peripheral edge portion of said boot frame, and said cylindrical portions extend through said boot and rotatably accommodate said shaft portions.

20. A lever apparatus, comprising:
- a body having an opening formed therein and a pivot support portion;
- a lever pivotally mounted within said body and extending through said opening;
- a resilient covering member enshrouding a portion of said lever and substantially covering said opening and having a first end and a second end; and
- a support means pivotally mounted at said pivotal support portion of said body at said opening for supporting said covering member;
- wherein said second end of said covering member is pivotally supported with respect to said body at said support means, said first end is fixedly secured to said lever, and said covering member is pivotable together with said lever.

21. A lever apparatus, comprising:
- a lever extending outwardly from the interior of a body through an opening formed in said body, said lever being pivotally supported in said interior of said body, and said body having a pivot support portion;
- an elastic covering member having a first end and a second end with said first end supported on said lever, and protruding from an inner circumference of said opening through and out of said opening so as to substantially cover said opening; and
- pivotally supporting means for supporting said second end of said covering member and allowing said second end to pivot with respect to said pivot support portion of said body in accordance with the pivoting of said lever;
- wherein said elastic covering member includes a cylindrical portion between said first and second ends, which extends outwardly from said interior of said body through said opening, said first end of said cylindrical portion being sealably secured on the outer periphery of an intermediate portion of said lever, and said second end of said covering member having a larger diameter than that of said first end so as to substantially cover said opening.

* * * * *